(12) United States Patent
Ohtsubo et al.

(10) Patent No.: US 8,159,774 B2
(45) Date of Patent: Apr. 17, 2012

(54) DISK DEVICE AND OFFSET CONTROL METHOD THEREOF

(75) Inventors: Jun Ohtsubo, Ome (JP); Daigo Nakamura, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/969,498

(22) Filed: Dec. 15, 2010

(65) Prior Publication Data

US 2011/0141600 A1     Jun. 16, 2011

(30) Foreign Application Priority Data

Dec. 15, 2009   (JP) .................................. 2009-284333

(51) Int. Cl.
*G11B 5/596*   (2006.01)
(52) U.S. Cl. ...................................................... 360/77.04
(58) Field of Classification Search ................... None
See application file for complete search history.

(56) References Cited

U.S. PATENT DOCUMENTS

| | | | |
|---|---|---|---|
| 5,923,491 A | 7/1999 | Kisaka et al. | |
| 6,049,440 A * | 4/2000 | Shu | 360/77.04 |
| 6,545,835 B1 * | 4/2003 | Codilian et al. | 360/77.04 |
| 6,707,635 B1 * | 3/2004 | Codilian et al. | 360/77.04 |
| 7,046,477 B2 | 5/2006 | Shibata | |
| 7,057,844 B2 * | 6/2006 | Sakai et al. | 360/77.04 |
| 7,193,809 B1 * | 3/2007 | Allen | 360/77.04 |
| 7,271,977 B1 * | 9/2007 | Melrose et al. | 360/77.04 |
| 7,489,468 B2 | 2/2009 | Ohinata et al. | |
| 7,583,470 B1 * | 9/2009 | Chen et al. | 360/77.04 |
| 7,633,705 B2 * | 12/2009 | Sudo | 360/77.04 |
| 7,746,593 B2 * | 6/2010 | Sudo | 360/77.04 |
| 7,835,106 B2 * | 11/2010 | Miles | 360/75 |
| 7,872,829 B2 | 1/2011 | Sakai | |
| 2005/0128635 A1 | 6/2005 | Shibata | |
| 2007/0139811 A1 | 6/2007 | Ohinata et al. | |
| 2008/0002280 A1 * | 1/2008 | Asakura | 360/76 |
| 2009/0168224 A1 | 7/2009 | Sakai | |
| 2010/0134917 A1 | 6/2010 | Sakai | |

FOREIGN PATENT DOCUMENTS

| | | |
|---|---|---|
| JP | 09-091906 | 4/1997 |
| JP | 2005-174510 | 6/2005 |
| JP | 2007-172733 | 7/2007 |
| JP | 2009-176403 | 8/2009 |

OTHER PUBLICATIONS

Notice of Reasons for Rejection mailed by the Japan Patent Office on May 10, 2011 in corresponding Japanese app. No. 2009-284333 in 5 pages.

* cited by examiner

*Primary Examiner* — Will J Klimowicz
*Assistant Examiner* — James L Habermehl
(74) *Attorney, Agent, or Firm* — Knobbe, Martens, Olson & Bear, LLP

(57) ABSTRACT

According to one embodiment, a disk device comprises a memory, detector, calculation module, and deactivation module. The memory is configured to store an offset control amount at a time of manufacture. The detector is configured to detect a disk run-out. The calculation module is configured to obtain an offset control amount when the detector detects the disk run-out. The deactivation module is configured to deactivate the offset control based on a difference between the offset control amount obtained by the calculation module and the offset control amount at a time of manufacture stored in the memory and based on the offset control amount obtained by the calculation module.

6 Claims, 6 Drawing Sheets

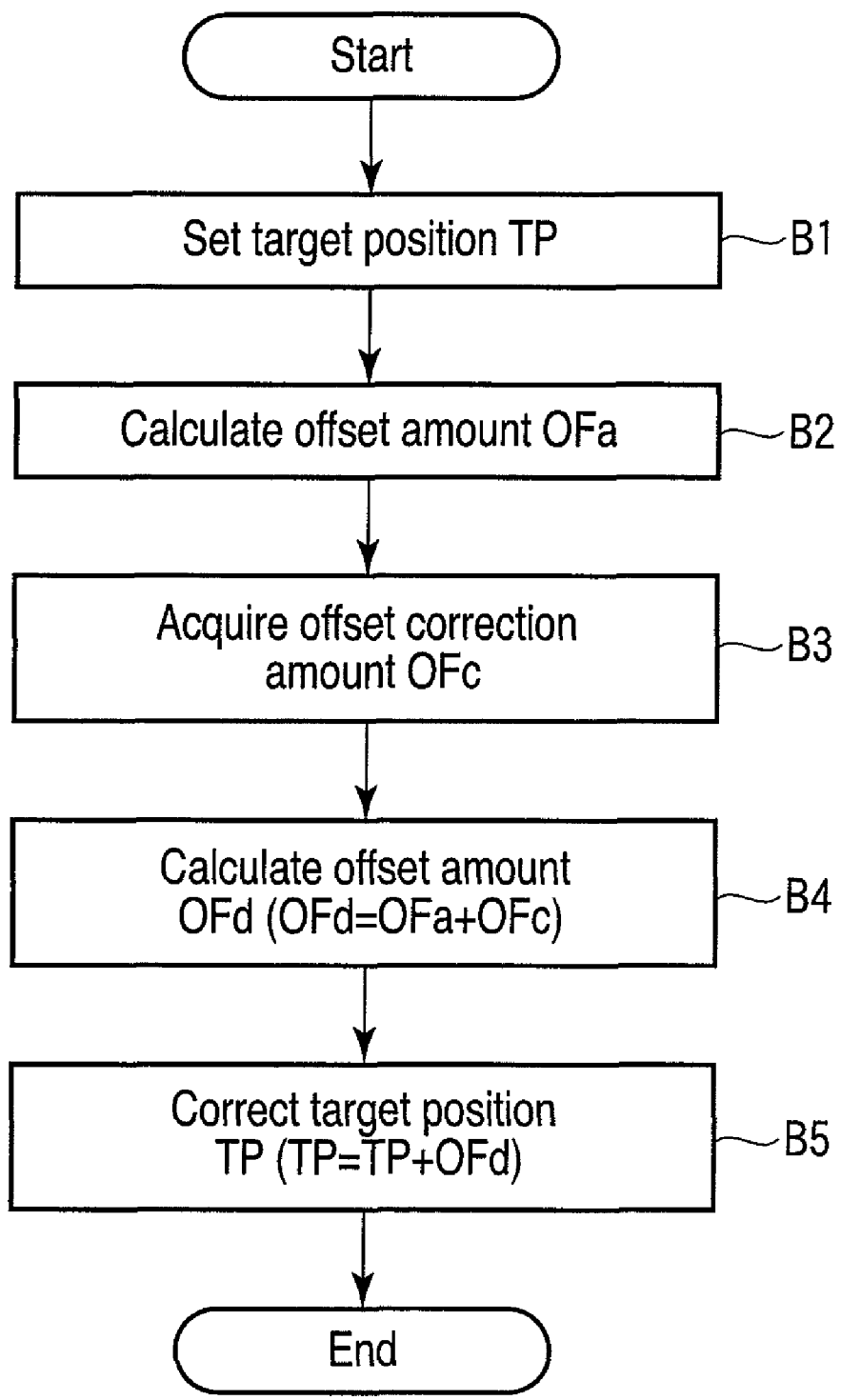
F I G. 5

DISK DEVICE AND OFFSET CONTROL METHOD THEREOF

CROSS-REFERENCE TO RELATED APPLICATIONS

This application is based upon and claims the benefit of priority from Japanese Patent Application No. 2009-284333, filed Dec. 15, 2009; the entire contents of which are incorporated herein by reference.

FIELD

Embodiments described herein relate generally to a disk device such as a hard disk drive.

BACKGROUND

In general, a disk device (also referred to as a disk drive) typified by a hard disk drive is provided with a magnetic head for recording data in or reproducing data from a magnetic disk medium (hereinafter simply referred to as a magnetic disk) which is a recording medium. As the magnetic head, a composite head is used in which a read head and a write head are separate and mounted on the same slider. The read head generally comprises a magnetoresistive (MR) element or a giant magnetoresistive (GMR) element, and performs a read operation (data reading operation). The write head generally comprises an inductive thin film head element, and performs write operation (data writing operation).

This kind of head is generally installed in a rotary actuator. The actuator is configured to be driven to rotate radially on a disk medium by the driving force of a voice coil motor (VCM) and thereby position the head at a target position (target track or target cylinder) on the disk medium.

Meanwhile, when the head is positioned on the disk medium by the rotary actuator, a gap distance (Grw) is present in a circumferential direction because the read head and the write head are separate. Moreover, since the read head and the write head are differently positioned radially on the disk medium due to the angle of rotation of the actuator, a so-called offset is generated.

Thus, the disk drive performs offset control for offset-based positional adjustments of the read head and the write head in order to position the magnetic head at the target position on the disk. The offset control is performed on the basis of an offset value that changes depending on the radial position on the disk. However, this offset value is a value that does not change over one revolution of the disk in the same track.

On the other hand, in the disk drive, a phenomenon known as a disk run-out is caused, for example, by an attachment error of a spindle motor or by an external shock or vibration. When the disk run-out is caused, a servo track deviation (servo track run-out) is generated from a turning circle locus on the rotation center of the disk. Therefore, accurate offset control of the magnetic head is not enabled by the offset value that does not change over one revolution of the disk in the same track.

In order to solve such a problem, a technique called dynamic offset control (DOC) is suggested wherein the offset value is changed on the basis of a disk run-out amount to perform offset control (e.g., Jpn. Pat. Appln. KOKAI Publication No. 2009-176403 (paragraph 0081)).

In a disk drive described in the patent publication, a servo pattern for offset measurement is reproduced in a particular zone of a non-servo region other than a servo region of the disk, thereby calculating an offset value that changes within one revolution of the disk. In a manufacturing process of the disk drive, when no disk run-out is caused after the first calculation of an offset value OF(s), the calculated offset value OF(s) is not updated and maintained as it is. On the other hand, when a positional error of the read head resulting from the DOC operation is beyond a threshold which is a reference value, it is determined that the disk run-out is caused. In this case, position information for offset measurement is again recorded, and a new offset value OF(s) is again calculated by the above series of calculation steps, thus updating the offset value stored in a memory.

However, this is not effective in the device described in Patent document when data recorded before the disk run-out is reproduced after the disk run-out in a disk drive which only performs the DOC during reproduction. When the DOC is only performed during reproduction, data is recorded in accordance with the disk run-out during recording. For the data recorded before the disk run-out, the read DOC has to be performed by use of an offset value suited to the disk run-out amount during recording. If the read DOC is performed by use of the offset value suited to the disk run-out amount after the disk run-out, a correction which is not suited to the disk run-out during recording is made. As a result, data access performance more deteriorates due to the DOC, and an error rate (BER) may rise.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

FIG. 5 is an exemplary flowchart illustrating a procedure of a position correction in a read operation according to the embodiment;

FIG. 8 is an exemplary graph showing a bit error rate when read DOC is on; and

DETAILED DESCRIPTION

Various embodiments will be described hereinafter with reference to the accompanying drawings.

In general, according to one embodiment, a disk device comprises a memory, detector, calculation module, and deactivation module. The memory is configured to store an offset control amount at a time of manufacture. The detector is configured to detect a disk run-out. The calculation module is configured to obtain an offset control amount when the detector detects the disk run-out. The deactivation module is configured to deactivate the offset control based on a difference between the offset control amount obtained by the calculation module and the offset control amount at a time of manufacture stored in the memory and based on the offset control amount obtained by the calculation module.

Figure 1:
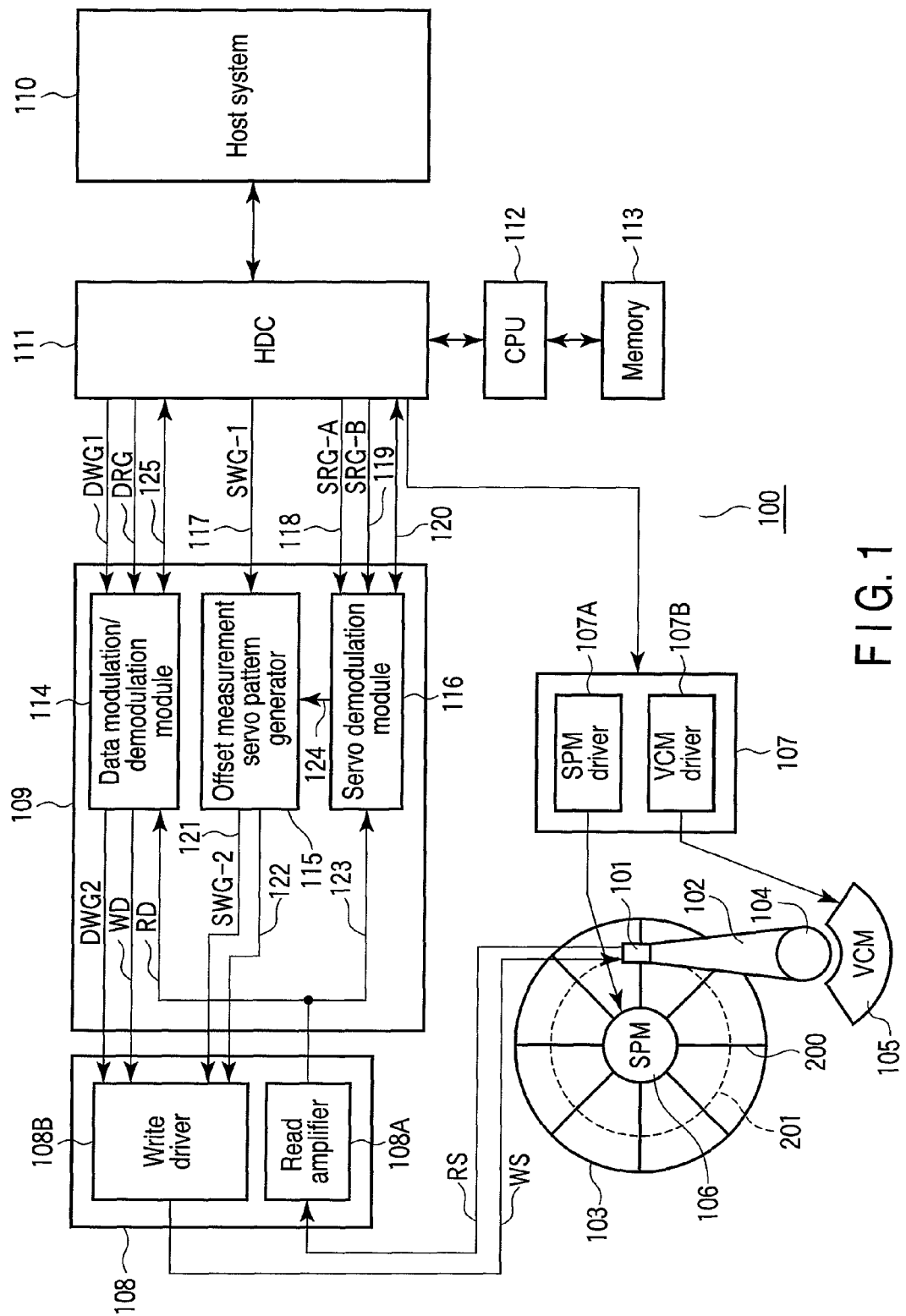
FIG. 1 is an exemplary block diagram showing the configuration of a disk device according to an embodiment.

FIG. 1 is a block diagram illustrating the configuration of a disk drive 100 according to the embodiment.

The disk drive 100 comprises a device mechanism (drive mechanism) and a later-described control/signal processing system. The device mechanism comprises a magnetic head 101, a disk medium (hereinafter referred to as a magnetic disk) 103 which is a magnetic recording medium, a spindle motor (SPM) 106 which rotates the magnetic disk 103, and an actuator on which the magnetic head 101 is mounted to move the magnetic head 101 radially on the magnetic disk 103.

The magnetic head 101 comprises a read head for reading (reproducing) data and servo information from the magnetic disk 103, and a write head for writing (recording) data and servo patterns for offset measurement (position information for offset measurement) in the magnetic disk 103. The magnetic head 101 has the read head and write head separately mounted on one slider which is a head main unit. Thus, a given offset (position shift) is produced between the track loci of the read head and write head. An offset value is dependent on radial positions on the disk. Here, the write head is located closer to the tip of the actuator than the read head. On inner circumferential tracks, the write head is located closer to the inner circumferential side than the read head. On outer circumferential tracks, the write head is located closer to the outer circumferential side than the read head.

The actuator comprises a suspension and arm 102 equipped with the magnetic head 101, a pivot 104 serving as a rotation shaft, and a voice coil motor (VCM) 105 which comprises a coil, a magnet and a yoke and which generates drive force. The actuator is controlled to move radially on the magnetic disk 103 under head positioning control (servo control) by a later-described microprocessor (CPU) 112. As a result, the magnetic head 101 is positioned at a target position (target track) on the magnetic disk 103.

On the magnetic disk 103, a plurality of radial servo regions 200 having predetermined spaces in the circumferential direction are provided, and a great number of concentric tracks (cylinders) 201 are further configured. In addition, the tracks 201 mean both a data track in which user data is recorded by the write head and a servo track including a plurality of servo regions 200.

The servo information is recorded in the servo regions 200. The servo information comprises an address code (cylinder code) for identifying each track, and a servo burst signal for detecting the position of the magnetic head 101 in the track. The CPU 112 uses the servo information read by the read head to perform the head positioning control (servo control).

The control/signal processing system comprises a motor driver 107, a head amplifier unit 108, a read/write channel 109, a hard disk controller (HDC) 111, the CPU 112 and a memory 113. The motor driver 107 has an SPM driver 107A for supplying a drive current to the SPM 106, and a VCM driver 107B for supplying a drive current to the VCM 105.

The head amplifier unit 108 comprises a read amplifier 108A for amplifying a read signal RS read by the read head of the magnetic head 101 and then outputting the amplified signal to the read/write channel 109. The head amplifier unit 108 also comprises a write driver 108B for converting write data WD output from the read/write channel 109 into a write signal (write current) WS and then supplying the write signal WS to the write head of the magnetic head 101. The write driver 108B converts the write data WD into the write signal WS in accordance with the timing of a write gate DWG2 output from a data modulation/demodulation module 114.

The read/write channel 109 is a signal processing unit for processing read/write data signals. The read/write channel 109 has the data modulation/demodulation module 114, an offset measurement servo pattern generator 115 and a servo demodulation module 116.

The data modulation/demodulation module 114 modulates (codes), to the write data WD, record data 125 which is transferred from the HDC 111 by the timing of a write gate DWG1. The data modulation/demodulation module 114 also demodulates (decodes) a read data signal RD output from the read amplifier 108A, to the record data 125 in accordance with the timing of a read gate DRG from the HDC 111, and outputs the record data 125 to the HDC 111.

The offset measurement servo pattern generator 115 generates servo record data 122 including a servo write gate signal 121 (SWG-2) and an offset measurement servo pattern (offset measurement position information) in accordance with the timing of a servo write gate signal 117 (SWG-1) output from the HDC 111. At the same time, a synchronization signal 124 is input to the servo pattern generator 115 from the servo demodulation module 116.

The servo demodulation module 116 demodulates (decodes) a servo reproduction signal 123 output from the read amplifier 108A into servo data 120 including an address code and servo burst signals (A to D), and outputs the servo data 120 to the HDC 111. At the same time, the servo demodulation module 116 demodulates the servo burst signals (burst patterns A, B) in accordance with the timing of a servo read gate 118 (SRG-A) and servo read gate 119 (SRG-B) that are output from the HDC 111.

The HDC 111 is an interface between the disk drive 100 and a host system (personal computer or digital equipment) 110, and controls the read/write transfers of the user data to/from the host system 110. The HDC 111 also controls the read/write operations of the read/write channel 109.

The CPU 112 is a main controller of the disk drive 100, and is a main component of a servo system for performing the head positioning control (servo control). The CPU 112 performs a seek operation and track following operation (position control) in the head positioning control, and also performs the estimation of a read/write gap according to the embodiment and offset control (DOC).

The memory 113 comprises a flash memory, a ROM and a RAM. Various kinds of data necessary for the control operation of the CPU 112 are stored in the memory 113.

Figure 2:
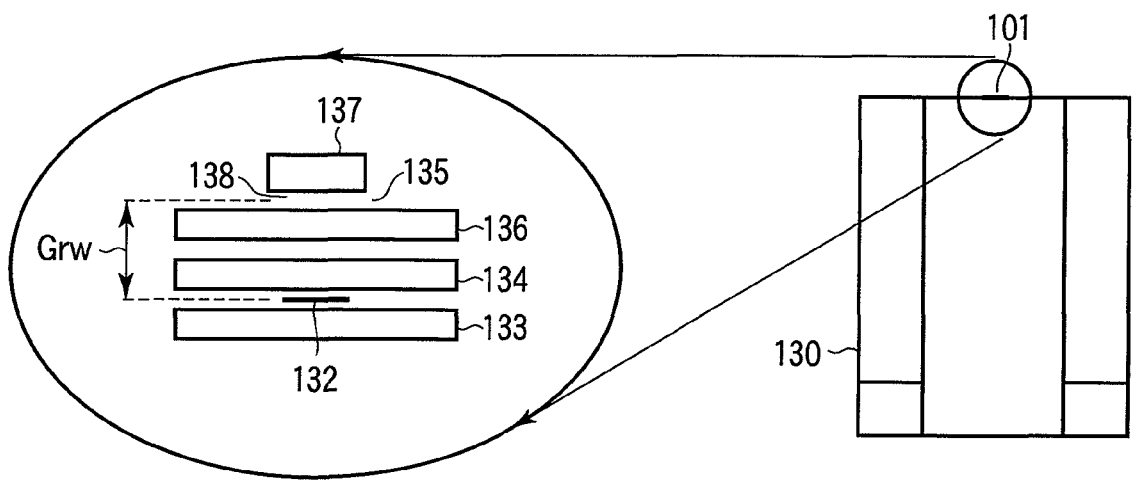
FIG. 2 is an exemplary diagram illustrating the structure of a head according to the embodiment.

In the head 101, a composite head element is mounted on a slider 130, as shown in FIG. 2. The composite head element comprises a GMR element forming a read head 132, and an inductive thin film head element forming a write head 135.

The read head 132 is separated from the write head 135 by a lower shield 133 and an upper shield 134. The write head 135 has a write gap 138 for generating a recording magnetic field between a lower magnetic pole 136 and an upper magnetic pole 137.

Here, when the head 101 is positioned on the magnetic disk 103, the read head 132 and the write head 135 have a gap distance (Grw) therebetween in the circumferential direction of the magnetic disk 103.

Figure 3:
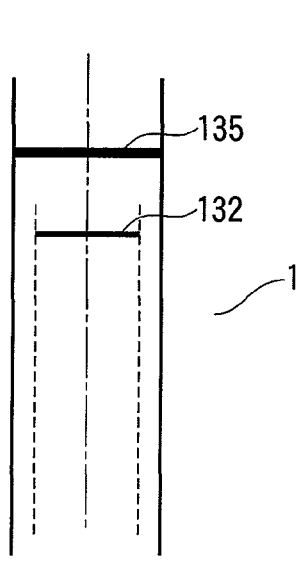
FIG. 3 is an exemplary diagram illustrating a skew angle in a head positioning operation according to the embodiment.

The offset in the case where the head 101 according to the embodiment is positioned at the target position on the magnetic disk 103 is described below with reference to FIG. 3 and FIG. 4.

As shown in FIG. 1, a rotary actuator is used as a head positioning mechanism in the disk drive according to the embodiment. When a head positioning operation is performed by this actuator, an inclination called a skew angle (angle θ) is generated, as shown in FIG. 4. This skew angle θ indicates an angle between a line connecting the rotation center (pivot) of the actuator to the central point of the head and a tangent to a track arc.

The skew angle θ is determined by the position of the head 101, the rotation central position of the SPM 106, and the rotation central position of the actuator. That is, the skew angle θ changes in accordance with a track position (cylinder position) for performing the read operation or write operation, i.e., in accordance with a radial position on the magnetic disk 103.

Figure 4:
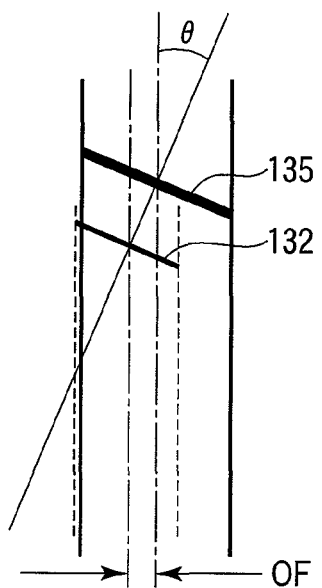
FIG. 4 is an exemplary diagram illustrating the relation between a skew angle and an offset in the head positioning operation according to the embodiment.

As shown in FIG. 4, if the skew angle θ is generated, an offset (OF) corresponding to a positional difference between the center line of the data track in which data is recorded by the write head 135 and the center line of the track reproduced by the read head 132. Thus, as shown in FIG. 3, in the case of a skew angle θ of 0 degrees, the central position of recording by the write head 135 is coincident with the central position of reproduction by the read head 132.

The offset amount OF is as indicated by Equation (1)

$$\text{Offset amount } OF = Grw \times \sin(\theta) \tag{1}$$

Wherein θ is the skew angle, and Grw is the gap distance between the read head 132 and the write head 135.

In the embodiment, a parameter for calculating the offset amount OF is stored in the memory 113 in a manufacturing process of the disk drive. Here, the offset amount OF is free from the influence of a later-described disk run-out, and is calculated for each track position (cylinder number) on the magnetic disk 103. Here, the offset amount OF is referred to as an offset amount OFa (first offset amount) for convenience.

When there is no influence of the disk run-out, a head positioning control system sets the offset amount OFa at zero to position the write head 135 at a track which is a target position, during a data write operation. During a data read operation, the head positioning control system positions the read head 132.

In this case, the head positioning control system calculates the offset amount OFa corresponding to a cylinder number which is a target position, and thereby corrects the position of the read head 132 (offsets the read head 132). As a result, the read head 132 can be placed on a track position where data is recorded.

Now, the head positioning operation in the reproduction considering the influence of the disk run-out in the embodiment is roughly described with reference to FIG. 5.

First, in the disk drive, parameters for calculating the offset amount OFa (first offset amount) are stored in the memory 113 for each track position (identified by the cylinder number) on the magnetic disk 103. As the parameters, information indicating the skew angle θ, and the gap distance Grw between the read/write heads 132, 135 is stored. The parameters also include parameters for calculating the skew angle θ. Specifically, the parameters include, for example, a distance v between the rotation central position of the SPM 106 and the rotation central position (pivot) of the actuator, and a distance g between a write gap position of the write head 135 and the pivot.

The head positioning operation (read DOC control) during the read operation is described.

First, in response to a read command from the host system 110, the CPU 112 sets, for the read head 132, a target position TP which is a target track where data to be read is recorded (block B1).

The CPU 112 drives and controls the actuator to perform the seek operation for moving the head 101 to a position located in the vicinity of the target position TP. The CPU 112 then shifts to the positioning operation (track following operation) for placing the head 101 on a track position which is the target position TP. During this positioning operation, the CPU 112 makes a position correction that conforms to the offset.

The CPU 112 uses the parameters stored in the memory 113 to calculate the offset amount OFa necessary for the position correction in accordance with Equation (3) (block B2). In addition, when the offset amount OFa corresponding to the target position is stored in the memory 113 in advance, the CPU 112 may read and acquire the offset amount OFa therefrom.

Here, when the disk run-out is caused to the disk drive by, for example, an external shock, the CPU 112 corrects the offset amount in accordance with the influence of the disk run-out (steps S3, S4). This is described in detail below.

First, the CPU 112 measures a disk run-out amount, for example, at the start of the operation of the disk drive. The disk run-out amount can be calculated from TPI if a cylinder address is measured by pressing each head onto the inner circumference. Differences resulting from stacks are eliminated by calculating the run-out amount for each head.

Here, a skew angle θz in the case of no disk run-out can be obtained by a cosine theorem in accordance with Equation (2):

$$\theta z = A \cos((b^2 + g^2 - v^2)/(2 \times b \times g)) - 90 \tag{2}$$

wherein A indicates an angle, and b indicates the radial position on the magnetic disk 103.

On the other hand, a skew angle θe in the case where an amount p of a position shift from the track center is produced by the disk run-out can be obtained by setting "b=b+p" in Equation (2).

The offset amount OFa relative to the skew angle θe in the case of no disk run-out can be represented by Equation (1) to Equation (3).

$$OFa = Grw \times \sin(\theta z) \tag{3}$$

From Equation (3), an offset amount OFb relative to the skew angle θe in the case of the disk run-out can be obtained by Equation (4).

$$OFb = Grw \times \sin(\theta e) \tag{4}$$

On the basis of Equations (3), (4), the CPU 112 calculates an offset correction amount OFc corresponding to the disk run-out in accordance with Equation (5) (block B3).

$$OFc = OFb - OFa \tag{5}$$

The CPU 112 stores, in the memory 113, the calculated offset correction amount OFc, for example, for each of the divisional zones on the magnetic disk 103 and for each servo sector.

As a result of the positioning operation described above, the read head 132 can be positioned at the target position during the read operation. In this case, the target position is not fixed, and changes depending on the disk run-out. The CPU 112 uses the offset correction amount OFc to find a second offset amount OFd that takes the disk run-out into account (block B4), and thereby enables the read head 132 to follow the target position (block B5). Here, as a result, the CPU 112 sets a target position whenever servo data is detected from the servo sector. That is, it has heretofore been the case that a target position is set only once for a read command. In contrast, in the embodiment, the target position is corrected whenever servo data is detected from the servo sector.

However, the DOC for reproduction shown in FIG. 5 does not enable correct positioning for data recorded before the disk run-out is caused by, for example, an external shock or vibration. The data recorded before the disk run-out has to be controlled in accordance with a run-out amount before the disk run-out. However, in the control shown in FIG. 5, the run-out amount before the disk run-out is not stored, so that corrections are made on the basis of different offset values in recording and reproduction. If the offset value corresponding to the disk run-out amount after the disk run-out is used to perform the read DOC, a correction which is not suited to the disk run-out in recording is made. Thus, data access performance may more deteriorate due to the DOC, leading to a rise in error rate (BER).

Figure 6A:
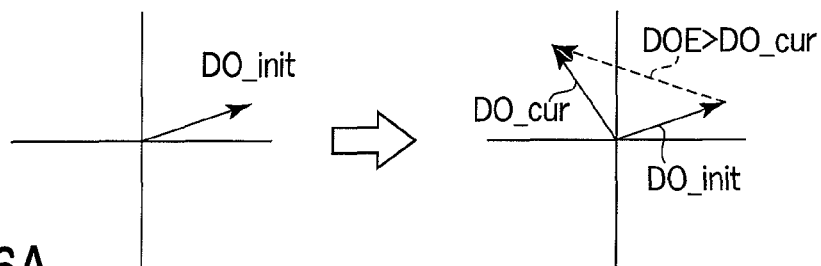
FIGS. 6A, 6B, and 6C show exemplary graphs illustrating the possibility of an error rate rising due to DOC during reading.
Figure 6B:
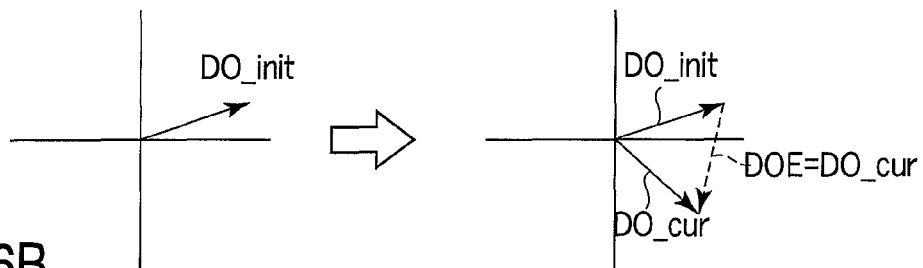
Figure 6C:
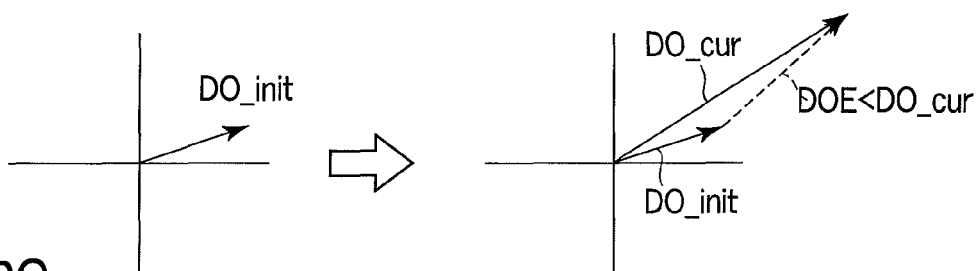

This situation is shown in FIGS. 6A-6C. A correction amount (second offset amount) based on a disk run-out obtained during the manufacture of the disk is DO_init. DO_init is OFc obtained by carrying out a processing at block B3 in FIG. 5 during the manufacture of the disk, and is stored in the memory 113. Suppose that a disk run-out is caused by, for example, an external shock or vibration after recording. Then, the read DOC shown in FIG. 5 is performed, and a correction amount based on the disk run-out obtained at the start of the operation of the disk is DO_cur. DO_cur is OFc obtained by carrying out a processing at block B3 in FIG. 5 during reading. If the correction amount is represented by a vector, a correction amount DOE for the DOC after the offset correction by DO_init is "DO_init-DO_cur." An absolute value of the DOE that is greater than DO_cur means that the offset correction by DO_init is different from the offset correction by DO_cur (e.g., the two corrections have opposite correction directions) and that the offset has increased due to the offset correction based on DO_init, as shown in FIG. 6A. Therefore, it is preferable in this case to make no offset correction by DO_cur (stop the DOC). The DOE that is equal to DO_cur (FIG. 6B) and the DOE that is smaller than DO_cur (FIG. 6C) mean that the offset correction by DO_init and the offset correction by DO_cur are in the same direction and that the offset has decreased by the offset correction based on DO_init. Therefore, it is preferable in this case to make an offset correction by DO_cur (perform the DOC).

Figure 7:
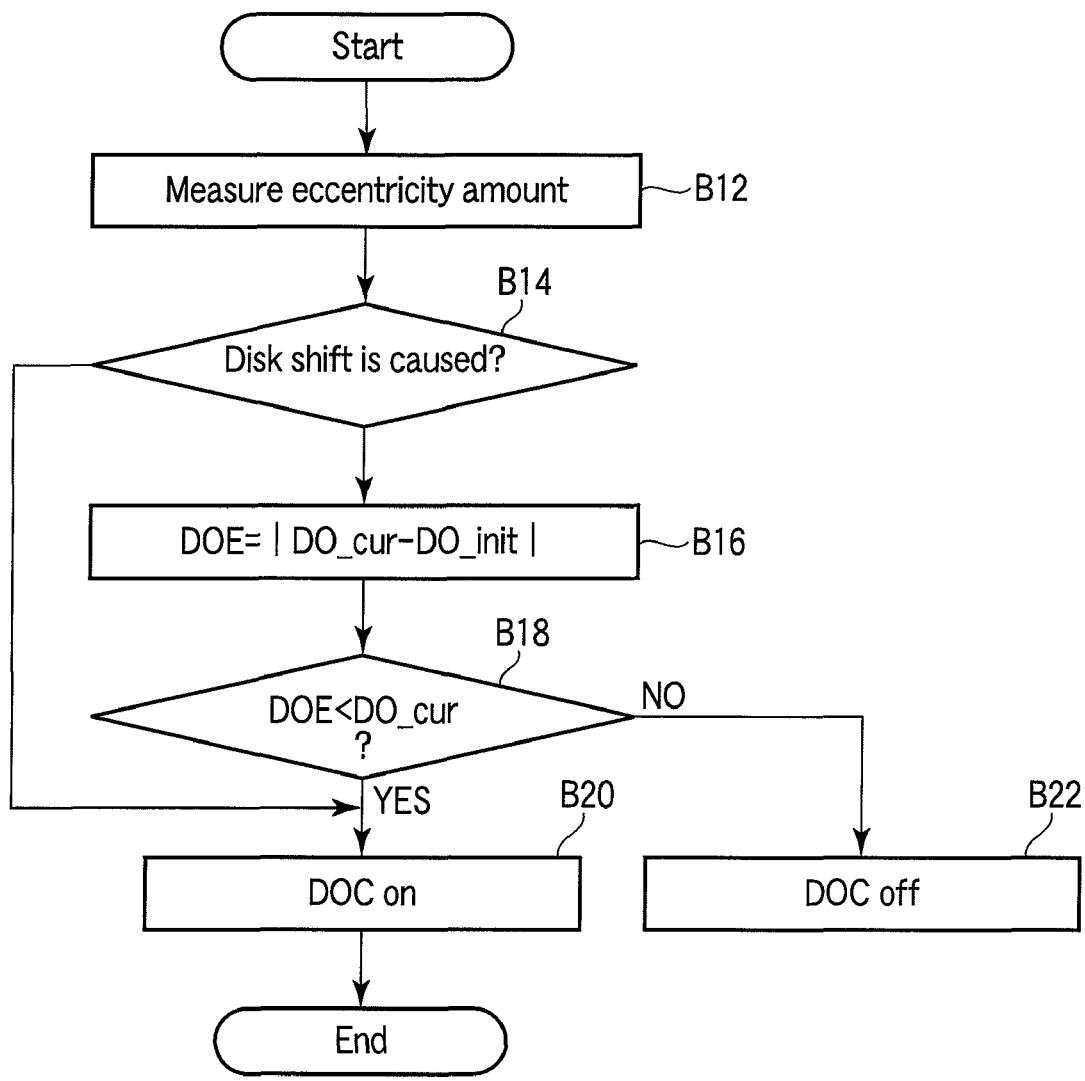
FIG. 7 is an exemplary flowchart showing on/off control of the DOC according to the embodiment.

FIG. 7 illustrates a processing flow for the read DOC according to the embodiment that uses the principle shown in FIGS. 6A-6C. A run-out amount is measured in block B12 immediately after the start of operation. The run-out amount can be calculated from the TPI if a cylinder address is measured by pressing each head onto the inner circumference. Differences resulting from stacks are eliminated by calculating the run-out amount for each head. It is determined in block B14 whether a disk shift is caused based on a determination whether the run-out amount is equal to or more than a predetermined value. If it is determined that no disk shift is caused, the DOC is switched on in block B20, and the DOC control shown in FIG. 5 is executed.

If it is determined that the disk shift is caused, a correction amount DOE=|DO_cur-DO_init| of the DOC after the offset correction by DO_init is obtained in block B16. In block B18, the DOE is compared with the correction amount DO_cur based on the current run-out amount (after the disk shift) to determine which of FIGS. 6A, 6B, and 6C corresponds. When the DOE is greater than DO_cur as shown in FIG. 6A, it can be determined that the offset has increased due to the offset correction based on DO_init, so that the DOC is stopped in block B22. When the DOE is equal to DO_cur as shown in FIG. 6B and when the DOE is lower than DO_cur as shown in FIG. 6C, it can be determined that the offset has decreased due to the offset correction based on DO_init, so that the DOC is switched on in block B20, and the DOC control in FIG. 5 is performed.

Thus, according to the embodiment, when the run-out amount in recording is different from the run-out amount in reproduction and the error rate rises due to the DOC, the DOC can be stopped. When the disk shift is caused by, for example, an external shock or vibration after recording, the DOC is stopped, and the rising of the error rate can be prevented.

Figure 8:
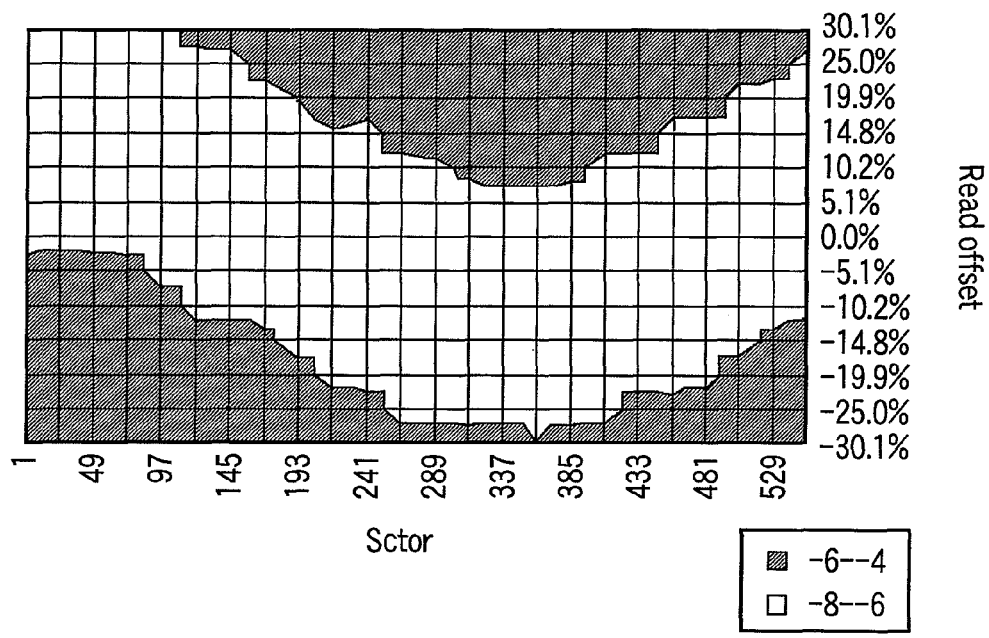
Figure 9:
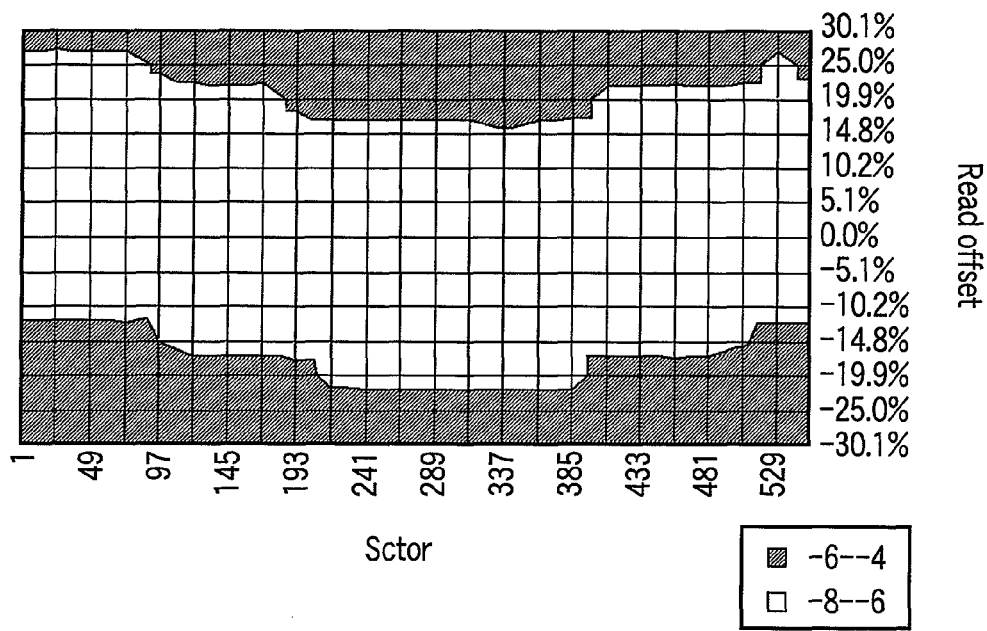
FIG. 9 is an exemplary graph showing a bit error rate when the read DOC is off.

FIG. 8 and FIG. 9 show bit error rates in the case where a certain track is reproduced with a changing offset when the disk run-out amount has changed after recording. FIG. 8 shows the case where the DOC is on. FIG. 9 shows the case where the DOC is off. In each graph, the horizontal axis indicates sector numbers, and the vertical axis indicates an offset change rate in which an offset set value during manufacture is 0%. In the case of FIG. 8 where the DOC is on, if the offset is changed about 5%, the BER is equal to −6 or less, and there is no read margin. In contrast, it is apparent that, in the case of FIG. 9 where the DOC is off, a sufficient BER can be secured even if the offset is changed about 10% or more, and there is a read margin.

According to the embodiment, when the error rate is likely to rise, the dynamic offset control is not performed. Consequently, the dynamic offset control can be properly performed even if a disk run-out is caused.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk device configured to perform an offset control to position a head in accordance with an off-track change caused by a disk run-out, the disk device comprising:
    a memory configured to store a first offset control amount when manufactured;
    a detector configured to detect a disk run-out after a start of a rotation of disk;
    a calculation module configured to obtain a second offset control amount based on the disk run-out detected by the detector; and
    a deactivation module configured to deactivate the offset control if an absolute value of a difference between the second offset control amount and the first offset control amount is greater than the second offset control amount.

2. The disk device of claim 1, further comprising a control amount calculator configured to obtain the first offset control amount based on a gap distance between a read head and a write head and a skew angle.

3. The disk device of claim 1, wherein the calculation module is configured to obtain the second offset control amount based on the run-out amount detected by the detector, a gap distance between a read head and a write head, and a skew angle.

4. An offset control method of a disk device, the method comprising:
- obtaining a first offset control amount when the disk device is manufactured;
- detecting a disk run-out after a start of a rotation of disk;
- obtaining a second offset control amount based on the detected disk run-out; and
- deactivating an offset control if an absolute value of a difference between the first and second offset control amounts is greater than the second offset control amount.

5. The offset control method of claim 4, wherein the first offset control amount is obtained based on a gap distance between a read head and a write head and a skew angle.

6. The offset control method of claim 4, wherein the second offset control amount is obtained based on the detected run-out amount, a gap distance between a read head and a write head, and a skew angle.

* * * * *